Patented Oct. 30, 1928.

1,689,761

UNITED STATES PATENT OFFICE.

ROGER ADAMS AND JAMES FRANKLIN HYDE, OF URBANA, ILLINOIS, ASSIGNORS TO THE NEWPORT COMPANY, OF CARROLLVILLE, WISCONSIN, A CORPORATION OF DELAWARE.

CYCLOHEXYL-ALKYL-PHTHALIC ESTERS.

No Drawing.  Application filed June 11, 1926.  Serial No 115,397.

This invention relates to organic solvents and more particularly to derivatives of phthalic acid in which one hydrogen of a carboxyl group is replaced by a cyclohexyl or substituted cyclohexyl group and the hydrogen of the other carboxyl by an alkyl group, and to a process for preparing the same. These compounds are high boiling liquids which dissolve the acetates and nitrates of cellulose very readily and can be used with other solvents in the preparation of pyroxylin and similar lacquers.

Other and further aspects of this invention will be apparent from the disclosures in the specification and appended claims.

We have found that phthalic anhydride may be heated with one molecular equivalent of cyclohexanol or substituted cyclohexanol, such as hexahydro p-cresol, and that the reaction takes place readily to give a cyclohexyl acid phthalate. Although this product may be readily isolated before converting to the cyclohexyl alkyl phthalate it is not necessary to do so but merely to add to this reaction mixture an excess of any of a variety of alcohols in the presence of a little mineral acid, or certain types of organic acids as a catalyst. The mixture is again heated for several hours, whereupon the cyclohexyl acid phthalate is converted into the cyclohexyl alkyl phthalate. The pure cyclohexyl alkyl phthalates are readily isolated from the reaction mixture.

The following equations represent the general reactions involved,

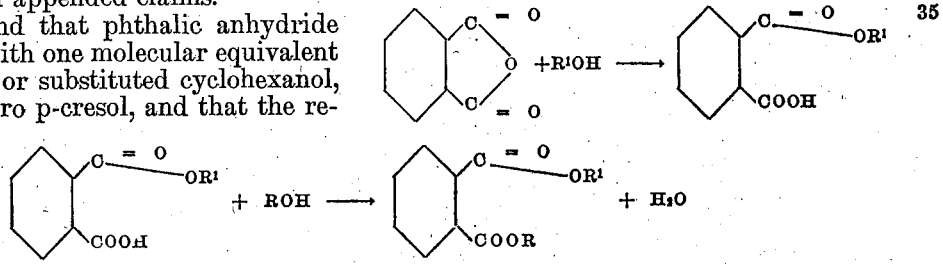

where R is an alkyl group and where $R^1$ is a cyclohexyl or substituted cyclohexyl group. The conditions of formation of these esters can be varied widely and the same products obtained.

Without limiting our invention to any particular procedure, the following example, in which parts by weight are given, will serve to illustrate our invention in the preferred form:

*Cyclohexyl ethyl phthalate.*—A mixture of 1 kilo of phthalic anhydride is mixed with 675 g. of cyclohexanol and heated in an apparatus provided with a reflux condenser at 115–125° C. for 8 to 12 hours. The reaction mixture is now treated with sodium carbonate solution whereupon practically everything dissolves. Any small amount of insoluble material may be extracted with ether. Upon acidification of the alkaline solution with hydrochloric acid, the cyclohexyl acid phthalate separates. It is in quite a pure state but may be recrystallized from acetone, from which it separates as white crystals melting at 95° C.

It is not necessary to isolate the cyclohexyl acid phthalate as just described, but the reaction mixture after the 8 to 12 hours heating may be treated directly with 650 g. of ethyl alcohol, preferably absolute, which contains a few grams of hydrogen chloride, or sulfuric acid or benzene sulfonic acid or some other acid catalyst. This mixture is then heated at 75–85° C. for 12 to 24 hours. The reaction mixture is subsequently heated until the excess of alcohol is removed (or it may be treated directly without removing the excess alcohol) and then washed with sodium carbonate solution, which extracts any unchanged cyclohexyl acid phthalate. The portion insoluble in the sodium carbonate solution is then vacuum distilled. There is usually obtained a small amount of diethyl phthalate and sometimes a little cyclohexanol as low boiling fractions and then the cyclohexylethyl phthalate distils practically constant. The formula for cyclohexyl ethyl phthalate is

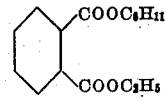

Other cyclohexyl alkyl phthalates are prepared in an exactly analogous manner.

The cyclohexyl ethyl phthalate boils at 180° C. at 5 mm. or at 219–220° C. at 21 mm. Cyclohexyl methyl phthalate boils at 168° C. at 2 mm., cyclohexyl n-propyl phthalate at 173–178° C. at 1.5 to 2 mm., cyclohexyl isopropyl phthalate at 168–172° C. at 1.5 to 2 mm., and cyclohexyl n-butyl phthalate at 186–188° C. at 1.5 to 2 mm. They are all colorless liquids, readily saponified with alkali to give cyclohexanol, phthalic acid and the corresponding alcohol.

We are aware that many changes may be made, and numerous details of the process may be varied through a wide range without departing from the principles of this invention, and we therefore do not purpose limiting the patent granted thereon, otherwise than necessitated by the prior art.

We claim as our invention:

1. As a new article of manufacture, cyclohexyl ethyl phthalate of the formula—

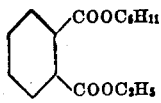

2. As a new article of manufacture, a product consisting chiefly of cyclohexyl ethyl phthalate and being a colorless liquid having a boiling point of 180° C., at 5 mm. pressure.

3. The process of preparing cyclohexyl ethyl phthalate, which comprises heating a mixture of cyclohexyl acid phthalate and ethyl alcohol containing a suitable esterification catalyst of acid character at a temperature of 75 to 85° C. for 12 to 24 hours, washing to remove unchanged cyclohexyl acid phthalate and vacuum distilling to obtain cyclohexyl ethyl phthalate.

In testimony whereof we have hereunto subscribed our names.

ROGER ADAMS.
JAMES FRANKLIN HYDE.